(12) United States Patent
Reiser

(10) Patent No.: US 7,976,997 B2
(45) Date of Patent: Jul. 12, 2011

(54) ROBUST HEATING OF FUEL CELLS DURING SUBFREEZING START

(75) Inventor: Carl A. Reiser, Stonington, CT (US)

(73) Assignee: UTC Power Corporation, South Windsor, CT (US)

( * ) Notice: Subject to any disclaimer, the term of this patent is extended or adjusted under 35 U.S.C. 154(b) by 103 days.

(21) Appl. No.: 12/448,628

(22) PCT Filed: Dec. 26, 2006

(86) PCT No.: PCT/US2006/049549
§ 371 (c)(1),
(2), (4) Date: Jun. 26, 2009

(87) PCT Pub. No.: WO2008/082383
PCT Pub. Date: Jul. 10, 2008

(65) Prior Publication Data
US 2010/0119884 A1 May 13, 2010

(51) Int. Cl.
*H01M 8/04* (2006.01)

(52) U.S. Cl. .......................... 429/431; 429/429; 429/444
(58) Field of Classification Search .................. 429/13, 429/22, 23, 24, 429, 431, 444
See application file for complete search history.

(56) References Cited

U.S. PATENT DOCUMENTS

2003/0207162 A1* 11/2003 Reiser ............................. 429/22
2005/0277003 A1* 12/2005 Dewey ............................ 429/12

OTHER PUBLICATIONS

"Rapid self-start of polymer electrolyte fuel cell stacks from sub-freezing temperatures", Ahluwalia, et al., Journal of Power Scources 162 (Aug. 9, 2006), 502-512.*

* cited by examiner

*Primary Examiner* — Jonathan Crepeau
*Assistant Examiner* — Kenneth Douyette
(74) *Attorney, Agent, or Firm* — M. P. Williams

(57) ABSTRACT

The electrical output connections (155, 158) of a fuel cell stack (151) are short circuited (200; 211, 212) during start up from freezing temperatures. Before the stack is short circuited, fuel is provided in excess of stoichiometric amount for a limiting stack current, and oxidant is provided to assure stoichiometric amount for the limiting stack current.

15 Claims, 2 Drawing Sheets

ROBUST HEATING OF FUEL CELLS DURING SUBFREEZING START

TECHNICAL FIELD

This disclosure relates to starting a fuel cell power plant from a freezing condition to a substantial fraction of its rated power in a matter of seconds. The start up employs a robust heating of the fuel cell stack by short circuiting the power output of the stack so that substantially all the power produced is in the form of internal heat. This start up mode continues for a period of time precalculated to provide the energy necessary to melt the ice in the fuel cell stack.

BACKGROUND ART

A rapid cold-start from frozen conditions is a key challenge in the development of a commercially viable vehicular PEM (Polymer Electrolyte Membrane) fuel cell power plant. This issue is critical because of the periodic operating nature of most transportation vehicles, their use in freezing environments, and the fact that each vehicle must contain all the equipment fuel and electric power necessary for start up under any circumstances. Parasitic power, space and cost constraints are also important considerations. Similarly, other portable or stationary fuel cell power plants may require the capability to survive subfreezing temperatures in their intended environments.

In addition, an objective set down by the auto industry is that a fuel cell power plant should be capable of producing about 60% of rated power within 30 seconds of its initiating start up, from a temperature of −20° C. Cold-start methods known to date do not meet this very challenging objective, requiring at least several minutes. Two examples of start up methods that do not meet this objective are disclosed in U.S. Pat. Nos. 5,798,186 and 6,329,089.

A variety of methods of heating a fuel cell stack, utilizing heaters other than the stack itself are known. However, such methods generally require several minutes to bring the stack temperature above the freezing temperature of water and depend on auxiliary power sources. To date, no procedure has been identified that meets the 30 second objective in a fuel cell power plant employing water transport plates.

SUMMARY

Boot strap starting, where the fuel cell is started up on its own without external heating, is the most attractive option for a fuel cell power plant start up from a frozen condition. During start-up from sub-zero temperatures, the operability of the fuel cell stack is subject to several performance limiting constraints. The frozen water in the membrane increases the resistance to flow of protons. The catalyst layers and gas diffusion layers may contain frozen water if adequate water removal shut down procedures were not followed. Frozen water in the catalyst layers and gas diffusion layers blocks gas pores thereby hindering the flow of reactants (e.g. oxygen) to the catalyst sites.

There are two general types of PEM fuel cells being considered in this disclosure. The first type employs porous separator plates or "water transport plates" which typically provide the functions of a flow field plate as well as a cell separator plate. The second type employs a solid separator plate which may also serve as a flow field. Fuel cells which employ porous separator plates will inherently have a greater volume of water to thaw but the procedures disclosed here apply equally to both types of cells. The procedure will also equally apply to fuel cells using water (including evaporative cooling) and or antifreeze such as glycol.

The frozen water problem is further aggravated by refreezing of product water when the cell starts to produce current. Therefore, a bootstrap start is governed by the competition between the water production rate and the rate of temperature rise in the cell. If the cell temperature crosses the freezing point before the water fills up too many of the pores in the catalyst and gas diffusion layers, then the bootstrap start will be successful. Bootstrap starting is most successful when maximizing the heat production and consumption capability of the fuel cell stack by running the stack at or very near its limiting current capability while the stack temperature remains below freezing. The limiting current is the maximum current the cell can sustain without being limited by reactant supply or stoichiometry at a cell voltage of approximately zero volts.

The improvement herein is predicated on the realization that to meet the objective of about 60% rated power within about 30 seconds, in a −20° C. ambient, the fuel cell stack must be allowed to produce and absorb as much heat energy as it possibly can, at any point in time after initiating a start up, as the operational process gradually clears the ice in the membrane, the catalyst and eventually the gas diffusion layers.

A second aspect of the improvement herein is based on the realization that the cells can be driven to negative voltages without harm as long as there is adequate hydrogen fuel supply to the anode. The additional heat generated from this mode of operation can reduce the time required for start up.

The improvement herein permits melting all of the ice in a fuel cell stack from a temperature of around −20° C. in less than half a minute. The stack is self-heated by the reaction of fuel and air at high current density and near-zero volts. This mode of start up generates the maximum heat in the fuel cell stack, for on the order of 20-30 seconds, or until the stack temperature exceeds 0° C. In the situation where the stack has the benefit of an external power supply the time may be reduced by increasing the level of heat generated.

This improved bootstrap start up is undertaken only if the controller determines that the fuel cell stack is at a subfreezing temperature. Under freezing conditions, the controller calculates both the amount of heat needed for that particular fuel cell stack to reach 0° C. from the current ambient temperature (or temperature of the stack). The energy requirement calculation includes heating of and the heat of fusion of all water which may possibly remain in the membranes, catalysts, gas diffusion layers and other cell components, as well as heating of the mass of the fuel cells themselves.

With the air off, hydrogen fuel is introduced to the anodes at well in excess of the stoichiometric amount for a predetermined heat-up current of about the limiting current of the stack at the starting temperature. The electrical power output connectors of the stack are short-circuited with a very low resistance connection, and the air supply is set to provide about twice the stoichiometric amount for the predetermined heat-up current. With the stack power output short circuited, all of the consumed fuel is converted to heat within the stack. Once the calculated amount of heat has been generated by the stack, the controller switches to a non freeze mode of operation to continue the start up which may include reducing the air flow and removing the stack short circuit. This switch point in the start up process may be indicated by lapse of a calculated time, a predetermined fixed time, such as about 20 seconds, or when 0° C. is detected in the stack. The controller may additionally be supplied with current draw and voltage data from the stack in order to ensure the stack has reached the unfrozen state as designed. The start up mode from 0° C. will be defined by the particular power plant design and its intended application.

As described, using minimal power to operate the air supply device, typically a blower or pump, at about twice the expected stoichiometric amount is to minimize battery or other auxiliary power requirements. This not only will tend to ensure sufficient power for the controller, and coolant pumps, should cooling be required before the fuel cell stack is fully on line, it also permits utilization of any excess power to aid in heating of the fuel cell stack.

In this aspect of improvements, the battery or other auxiliary power source is connected in series with the short circuit, the air blower being connected to the power source at the same time. When current flow from the auxiliary source contributes to heating of the fuel cell stack components, the heating calculation is altered to take the additional heat into account. The external power source may cause sufficient additional current to flow through the fuel cell stack to cause voltage in the cells to become negative. The negative cell voltage does not damage the cell stack as long as adequate hydrogen is supplied to the anodes. Should the controller sense an inadequate reserve of auxiliary power (either due to the cold or usage thereof by vehicle operators), connection of the auxiliary power to the stack can be omitted, and the calculation of time required to generate the requisite amount of heat would not involve current from the auxiliary power.

Other improvements, features and advantages will become more apparent in the light of the following detailed description of exemplary embodiments thereof, as illustrated in the accompanying drawings.

MODE(S) OF IMPLEMENTATION

Figure 1:
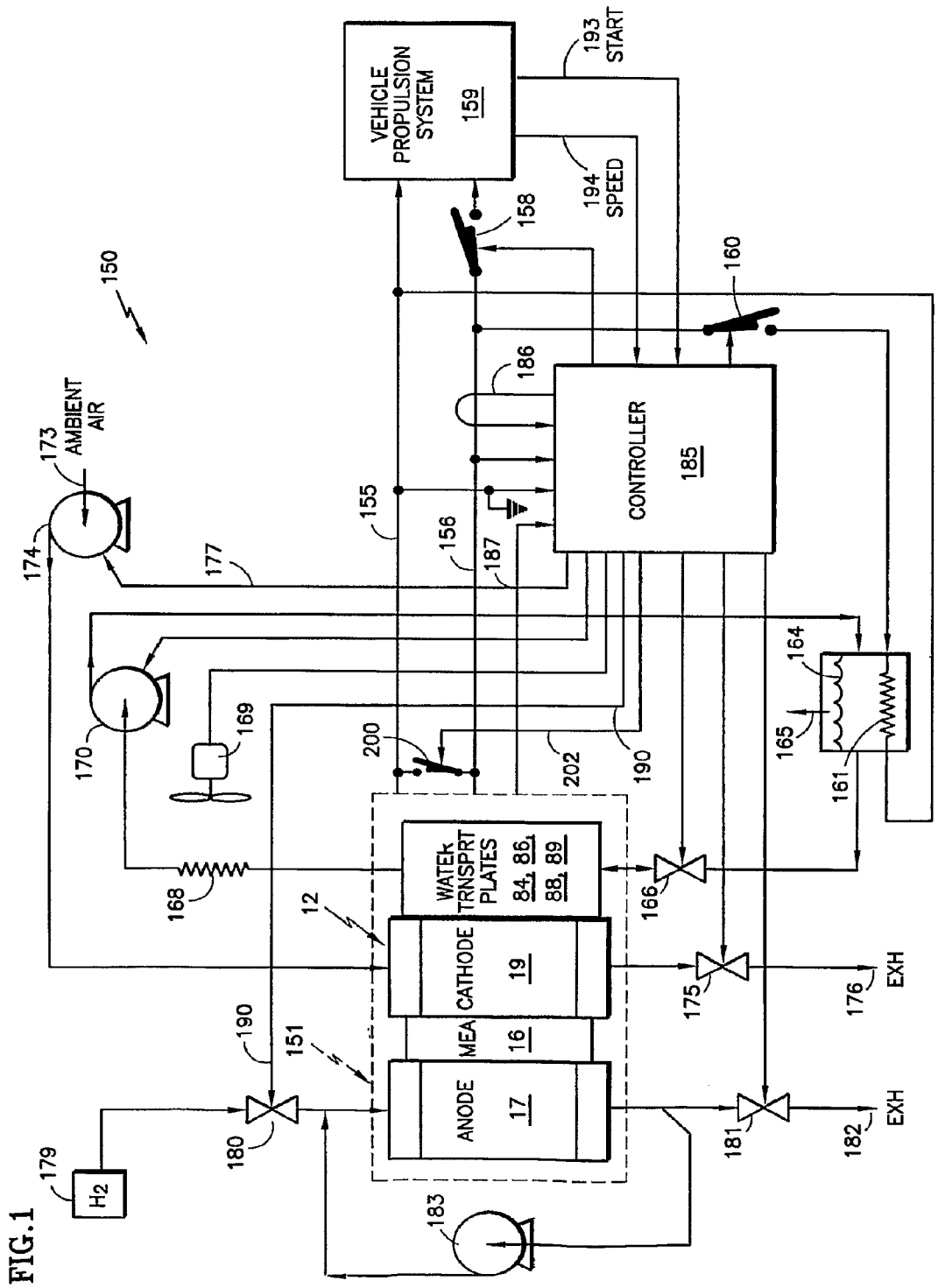
FIG. 1 is a schematic illustration of an exemplary fuel cell power plant associated with a vehicle engine propulsion system, including a fuel cell stack with which the present improvement may be practiced.

Referring to FIG. 1, an exemplary fuel cell power plant is shown powering a vehicle. The vehicle 150 includes a fuel cell stack 151 comprising a plurality of contiguous fuel cells, only one fuel cell 12 being shown. The electrical output at the positive and negative terminals of the fuel cell stack 151 is connected by a pair of lines 155, 156 through a switch 158 to a vehicle propulsion system The output may also be connected through a switch 160 to an auxiliary heater 161 in a reservoir 164 of a water circulation system the reservoir having a vent 165. The water circulation system may include a trim valve 166, water passages, such as those within water transport plates 84, 86, 88, 89, a radiator and fan 168, 169 which is selectively operable to cool water circulating in the system, and a water pump 170. Ambient air at an inlet 173 is provided by a pump, such as a blower 174, to the oxidant reactant gas flow fields of the cathode 19, and then through a pressure regulating valve 175 to exhaust 176. The air flow is controlled by a signal on a line 177. Hydrogen fuel is supplied from a source 179 through a pressure regulating valve 180 to the fuel reactant gas flow fields of the anode 17, and then through a flow regulating valve 181 to exhaust 182. The fuel system also includes a fuel recycle loop with a pump 183 that recirculates the fuel gas as required.

A controller 185 monitors load current determined by a current detector 186 as well as the voltage across the lines 155, 156; it may also have temperature of the stack provided on a line 187. The controller, in turn, can control the valve 180 over a line 190, as well as controlling the other valves, the switches 158, 160 and the pumps 174, 170, as shown in the figure.

The controller 185 responds to start and speed control signals from the vehicle propulsion system 159 on lines 193 and 194, which will respectively indicate when the fuel cell stack should commence operation and the amount of power being demanded by the vehicle propulsion system.

The improvement herein includes a switch 200 with which the electrical power output connections 155, 156 of the fuel cell stack can be short-circuited in response to a signal on a line 202 from the controller 185. The short circuit should be on the order of 100 micro ohms, or less.

As an example, consider a 75 kw fuel cell power plant having a stack of 275 cells, each cell having about a 400 square centimeter active area, in which the reactant gas flow field plates are porous, hydrophilic water transport plates having water channels between the water transport plates, To achieve 60% power, all of the ice must be melted, meaning that the Interior of the stack must exceed 0° C. In a typical stack of the type described, to heat from −20° to 0° C. requires about 65 kw minutes which is obtainable in about 24 seconds in stacks that are typical of those that may be used in vehicle propulsion systems, even those with porous, hydrophilic reactant gas flow field plates which may have some water (or ice) therein.

With the stack short-circuited so the cells are operating at essentially zero volts (which may be on the order of a few millivolts or so), and with fuel provided at about 1.7 times the stoichiometric amount for the presumed limiting current of the stack, the current will be limited only by the stack's performance capability.

The method herein contrasts with those of the prior art in having high current density within the cells, without use of any external load. The method also departs from the prior art both in providing the high current density substantially instantaneously, while providing more than a stoichiometric amount of fuel and air for maximum stack current, with a short-circuiting load rather than by controlling current with resistive loads which drop the usual voltage thus wasting power externally of the fuel cells. Stated alternatively, the improvements herein cause all of the energy which can be created in current flow generated by the cells to remain as heat within the cells.

Figure 2:
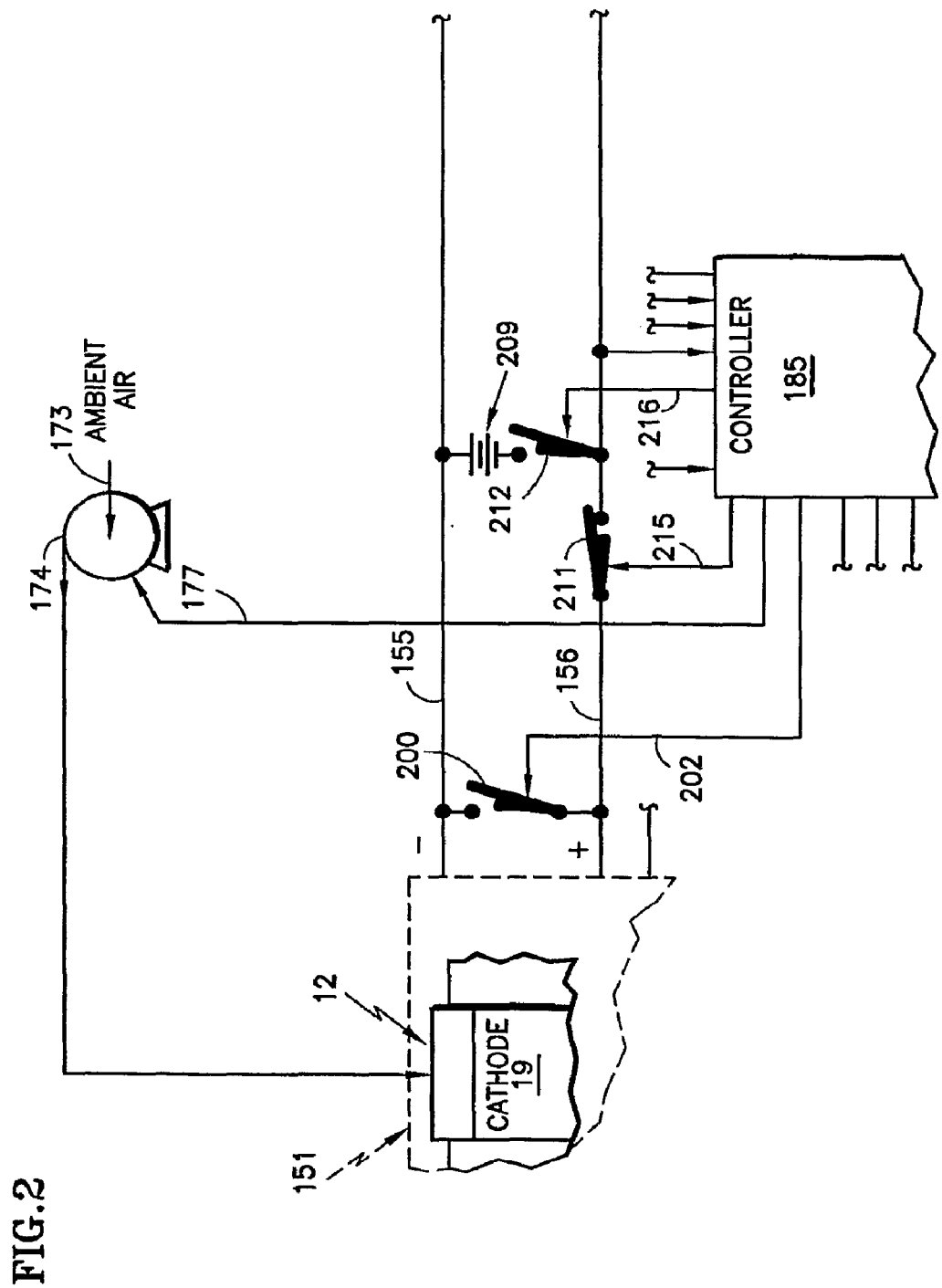
FIG. 2 is a fragmentary schematic illustration of an alternative embodiment in accordance herewith.

Referring now to FIG. 2, a further improvement allows use of power from an auxiliary power source, which may comprise one or more batteries, supercapacitors, or an external power supply such as grid power to provide additional current through the fuel cell stack thereby increasing the internal heating thereof. In FIG. 2, the auxiliary power source is shown as a battery 209 which may be connected in series with the stack 151 through closure of two switches 211, 212 in response to corresponding signals on lines 215, 216 from the controller 185.

The previous method of heating the stack is altered in that the switch 200 is not closed, but the switches 211 and 212 are closed instead. This short circuits the output through the battery 209 which provides additional current to the fuel cells and will typically drive the average cell voltage negative. However, so long as the fuel supplied to the stack remains well in excess of the stoichiometric amount, negative voltages will not harm the structures of the fuel cells.

In a general case when the fuel cell stack 151 is driving a load over the lines 155, 158, the switch 211 will be closed and the switch 212 will be open. In the general case when the auxiliary power supply 209 is driving the load (typically auxiliary equipment), the switches 211 and 212 will be opened while other switches, not shown, will connect the auxiliary power supply to the intended load with correct polarity.

In utilizing the improvement of FIG. 2, the calculation of heat supplied per unit time includes the additional current from the auxiliary power source 209; this added current will either reduce the amount of time required to reach 0° C., permit successful startup at temperatures much colder than −20° C., or allow heating the stack with somewhat less than maximum current, which could be controlled, if desired, by the amount of air provided during the heating process.

The invention claimed is:

1. A method of bringing a fuel cell stack (151) from a particular temperature below the freezing temperature of water to 0° C., characterized by:
    (a) providing flow of hydrogen (179, 180) to the anodes of the fuel cell stack well in excess of the stoichiometric amount for limiting stack current;
    (b) interconnecting (211, 212) electrical output terminals (155, 156) of the stack (151) with an auxiliary power source (208), thereby to provide additional current through the stack to increase the amount of heat generated in said stack; and
    (c) after said step (b), providing a flow of air (174, 175) to the cathodes of said fuel cell stack, in an amount in excess of the stoichiometric amount for said limiting stack current, for a period of time.

2. A method according to claim 1 further characterized by:
    (d) after said step (c), switching said stack to a nonfreeze start up mode.

3. A method according to claim 1 further characterized by:
    (d) after said step (c), connecting a load (159) to the stack.

4. A method according to claim 1 further characterized by:
    (d) after said step (c), connecting a vehicle propulsion system (159) as a load across the stack.

5. A method according to claim 1 further characterized in that said step (c) comprises providing a flow of air (174, 175) to the cathodes of said fuel cell stack, in an amount in excess of the stoichiometric amount for said limiting stack current, for a fixed time of about 20 seconds.

6. A method according to claim 5 further characterized by:
    (d) after said step (c), switching said stack to a nonfreeze start up mode.

7. A method according to claim 5 further characterized by:
    (d) after said step (c), connecting a normal load (159) to the stack.

8. A method according to claim 5 further characterized by:
    (d) after said step (c), connecting a vehicle propulsion system (159) as a load across the stack.

9. A method according to claim 1 further characterized in that said step (c) comprises providing a flow of air (174, 175) to the cathodes of said fuel cell stack, in an amount in excess of the stoichiometric amount for said limiting stack current, until the temperature of said stack is determined to have reached at least about 0° C.

10. A method according to claim 9 further characterized by:
    (d) after said step (c), switching said stack to a nonfreeze start up mode.

11. A method according to claim 9 further characterized by:
    (d) after said step (c), connecting a load (159) to the stack.

12. A method according to claim 9 further characterized by:
    (d) after said step (c), connecting a vehicle propulsion system (159) as a load across the stack.

13. A method according to claim 1 further characterized by:
    before said step (c), providing a predetermination of the amount of heat required to bring the fuel cell stack (151) from a particular temperature below the freezing temperature of water to about 0° C.; and in that
    said step (c) comprises providing a flow of air (174, 175) to the cathodes of said fuel cell stack, in an amount in excess of the stoichiometric amount for said limiting stack current for a period of time required to provide said amount of heat to the stack.

14. A method according to claim 1 further characterized by:
    (d) after said step (c), connecting a load (159) to the stack.

15. A method according to claim 1 further characterized by:
    (d) after said step (c), connecting a vehicle propulsion system (159) as a load across the stack.

* * * * *